United States Patent [19]

Sato et al.

[11] Patent Number: 4,650,022

[45] Date of Patent: Mar. 17, 1987

[54] REAR WHEEL STEERING DEVICE FOR MOTORCYCLES

[75] Inventors: Toshiyuki Sato, Fukuroi; Atsushi Matsuda, Iwata, both of Japan

[73] Assignee: Yamaha Hatsudoki Kabushiki Kaisha, Iwata, Japan

[21] Appl. No.: 813,694

[22] Filed: Dec. 27, 1985

[30] Foreign Application Priority Data

Jan. 9, 1985 [JP] Japan .................................... 60-2569
Feb. 8, 1985 [JP] Japan .................................... 60-21804

[51] Int. Cl.$^4$ ............................................. B62K 21/00
[52] U.S. Cl. ..................................... 180/219; 180/227
[58] Field of Search ............... 180/219, 220, 222, 223, 180/224, 227; 280/267, 269, 266

[56] References Cited

U.S. PATENT DOCUMENTS

| 602,034 | 4/1898 | Murphy | 280/266 |
| 2,920,709 | 1/1960 | Holmes et al. | 280/254 |
| 4,157,739 | 6/1979 | Frye | 180/224 |

FOREIGN PATENT DOCUMENTS 4491 5/1901 Denmark .......................... 280/267

*Primary Examiner*—John A. Pekar
*Attorney, Agent, or Firm*—Ernest A. Beutler

[57] ABSTRACT

Two embodiments of steering arrangements for motorcycles wherein the rear wheel is supported for steering movement and is mechanically coupled to the mechanism for steering the front wheel so that both wheels will be steered in unison. In one embodiment, the front and rear wheels are steered in the same direction while in the other embodiment, they are steered in opposite directions.

15 Claims, 13 Drawing Figures

REAR WHEEL STEERING DEVICE FOR MOTORCYCLES

BACKGROUND OF THE INVENTION

This invention relates to a rear wheel steering device for motorcycles and more particularly to an improved and simplified arrangement for steering both the front and rear wheels of a vehicle such as a motorcycle.

Most vehicles intended for use on public roads for transportation are designed so that they include one or more steered front wheels and one or more non-steered rear wheels. Motorcycles are typical examples of this type of vehicle wherein there is a steered front wheel and a non-steered driven rear wheel. Although such an arrangement offers the advantage of simplicity, it does not necessarily offer the best handling when rounding curves or changing directions. That is, when turning, the front wheel is steered into the direction of the turn but the rear wheel is still pointed in a direction tending to go straight ahead. This can cause difficulties in handling.

It is, therefore, a principal object of this invention to provide an improved steering arrangement for vehicles wherein both the front and rear wheels are steered.

It is a further object of this invention to provide a steering mechanism for vehicles that will improve their handling.

If it is desired to steer the rear wheel as well as the front wheel of a vehicle, it is important that the steering relationship between the front and rear wheels be accurately and positively controlled. It is, therefore, a still further object of this invention to provide a device for positively steering the rear wheel of a vehicle in response to steering movement of its front wheel.

It is a further object of this invention to provide an improved rear wheel steering mechanism for a motorcycle wherein the steering is controlled by the positioning of the front wheel.

SUMMARY OF THE INVENTION

This invention is adapted to be embodied in a vehicle having at least one dirigible front wheel steered by an operator and at least one rear wheel. Means are provided for supporting the rear wheel for steering movement and means mechanically couple the front wheel to the rear wheel for simultaneous steering movement.

DETAILED DESCRIPTION OF THE PREFERRED EMBODIMENTS

Figure 1:
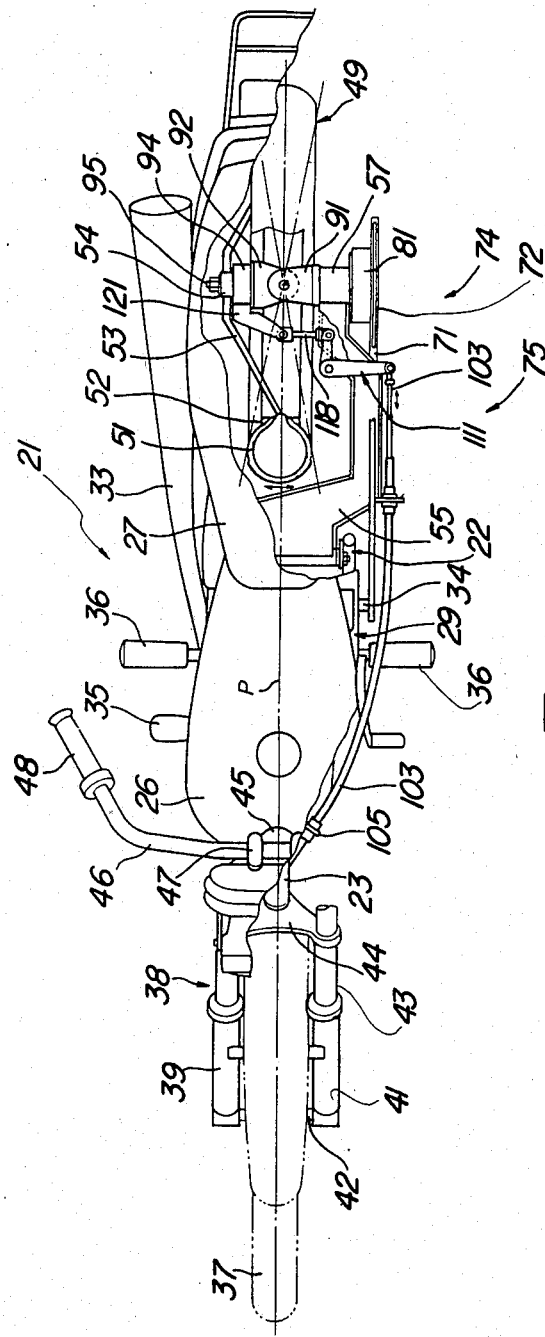
FIG. 1 is a top plan view, with portions broken away and other portions shown in section, of a motorcycle constructed in accordance with a first embodiment of the invention.
Figure 2:
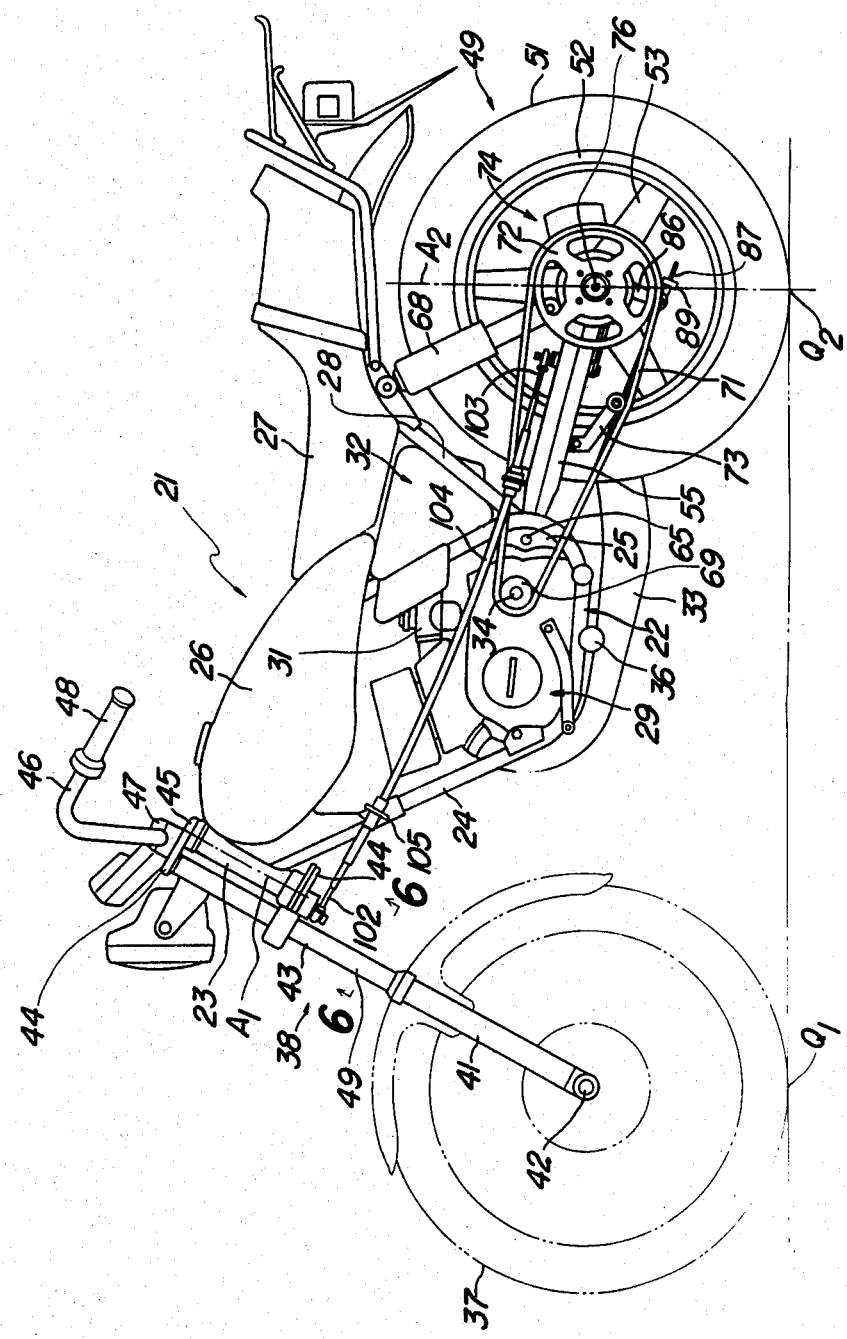
FIG. 2 is a side elevational view of the motorcycle, with portions shown in phantom.

Referring first to the embodiment of FIGS. 1 through 6 and initially primarily to FIGS. 1 and 2, a motorcycle constructed in accordance with this embodiment is identified generally by the reference numeral 21. The motorcycle 21 includes a frame assembly, indicated generally by the reference numeral 22, and which may be of any known type. In the illustrated embodiment, the frame assembly 22 is depicted as being made up of a welded tubular construction including a head pipe 23, a main tube (which does not appear in the figures), a down tube 24 and a bracket 25 that is affixed to the down tube and a rearwardly and downwardly projecting portion of the main tube. A fuel tank 26 is supported on the main tube and is positioned forwardly of a seat 27 that is supported on a seat rail and a seat pillar rail 28 of the frame assembly 22. Since the frame assembly per se forms no part of the invention, a further description of it is believed to be unnecessary.

An internal combustion engine, indicated generally by the reference numeral 28, is supported within the frame assembly 22 in a known manner. In the illustrated embodiment, the engine 29 is depicted as being of the reciprocating type and has one or more cylinders that receive a fuel/air charge from a carburetor 31 that is positioned rearwardly of the cylinder block and which extends in a generally horizontal direction. An air cleaner and air silencer assembly 32, which is positioned within the frame 22 rearwardly of the carburetors 31 and beneath the seat 27, supplies air to the carburetor 31. In addition, the engine 29 is provided with an exhaust system 33 for silencing the exhaust gases and discharging them to the atmosphere. The engine 29 also includes a combined crankcase, transmission assembly that drives an output shaft 34 at any of a plurality of selected speed ratios.

A kick starter assembly 35 is provided at one side of the engine 29 for its starting. In addition, a pair of foot pegs 36 are supported by the frame assembly 22 and extend outwardly from the sides thereof to afford a rest for the rider's feet.

A front wheel 37 is supported from the forward portion of the frame assembly 22 and specifically the head pipe 23 for steering and suspension movement by means of a front wheel steering assembly, indicated generally by the reference numeral 38. The front wheel steering assembly 38 includes a front fork 39 having a tubular suspension system 41 that carries the front wheel 37 for rotation about an axis 42 at its lower end. The system 41 is supported for vertical movement relative to an upper portion 43 so as to accommodate controlled suspension movement for the front wheel 37.

Upper and lower brackets 44 connect the front fork upper portion 39 to a steering shaft 45 that is journaled for rotation about a front steering axis $A_1$ is journaled in the head pipe 23. A handlebar assembly 46 is connected to the brackets 44 and steering shaft 45 by a mechanism 47. The handlebar 46 carries hand grips 48 at its outer end. It should be readily apparent that a rider positioned on the seat 27 may steer the front wheel 37 through the hand grips 48 and handlebar 46.

The suspension movement of the front wheel 37 is about an axis that is inclined to the vertical and which is parallel to the steering axis $A_1$ so that the front wheel 37 contacts the ground line GL at the point $Q_1$.

A driven rear wheel assembly, indicated generally by the reference numeral 49, is carried at the rear end of the frame assembly 22 in a manner to be described. The rear wheel 49 includes a tire 51 that is mounted on a rim 52 that is carried by spokes 53 and connected to a hub portion 54.

It should be noted that the motorcycle 21 as thus far described is generally conventional in configuration and, for that reason, only the general construction has been described in detail.

Figure 3:
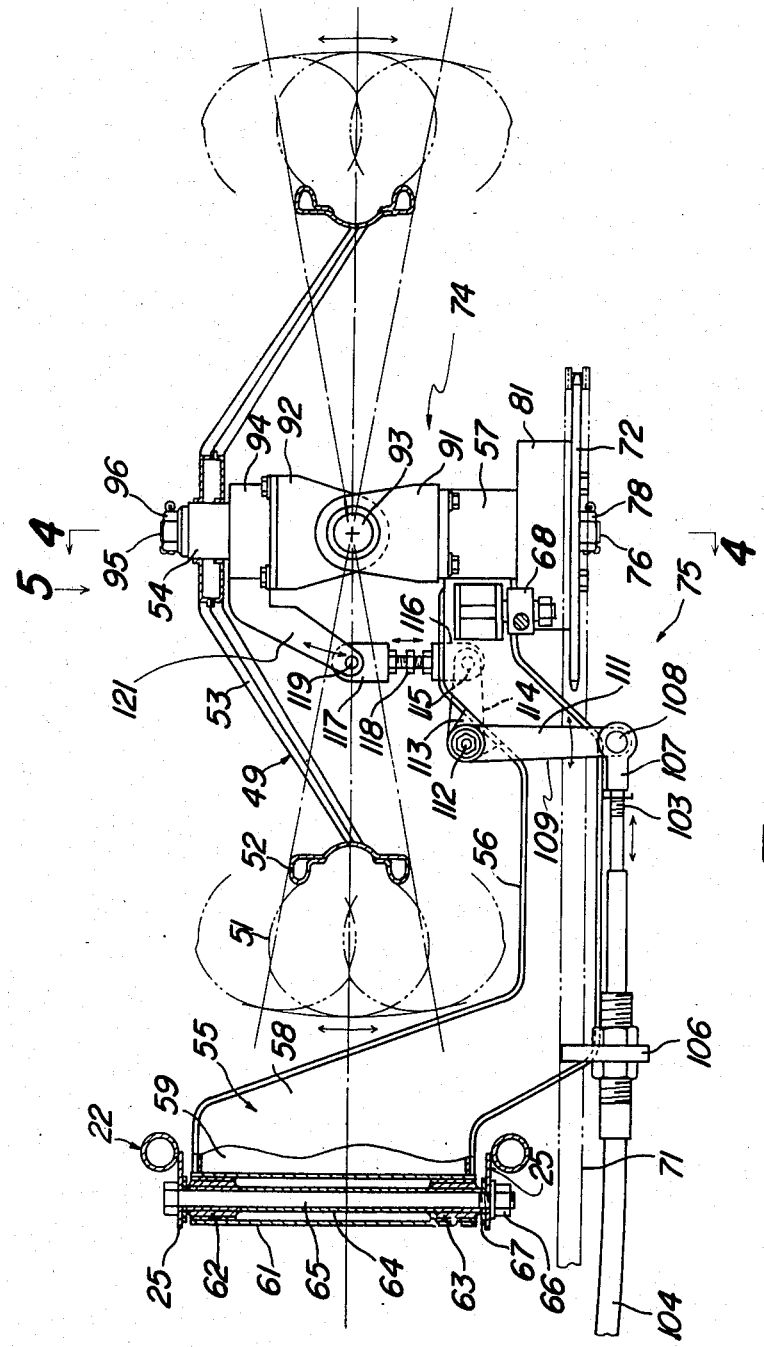
FIG. 3 is an enlarged, horizontal cross-sectional view taken through the axis of pivotal support of the rear wheel.
Figure 4:
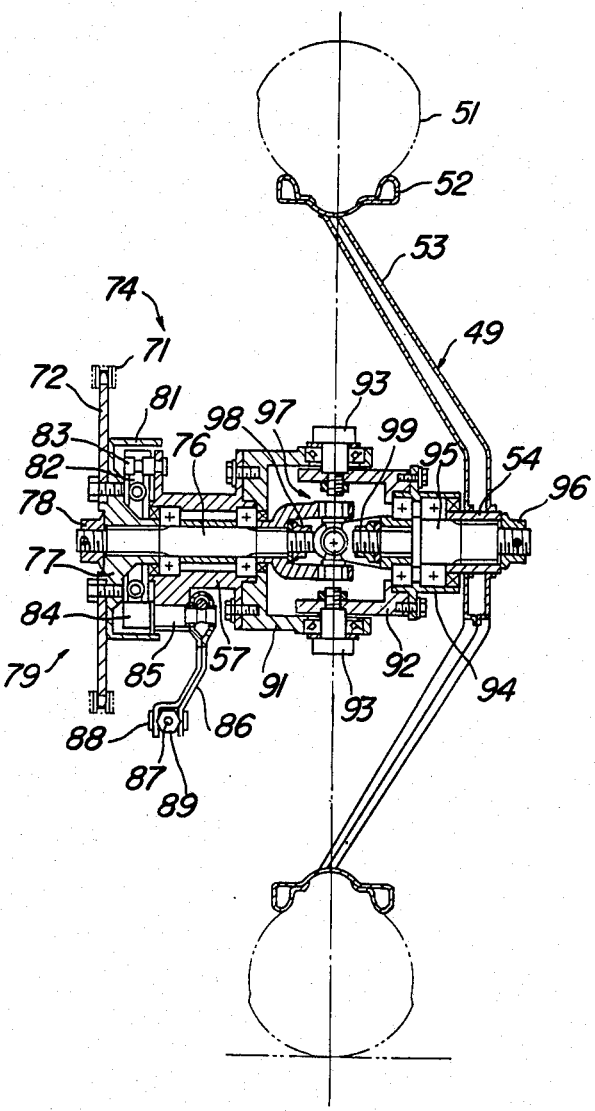
FIG. 4 is a reduced scale, cross-sectional view taken along the line 4—4 of FIG. 3.
Figure 5:
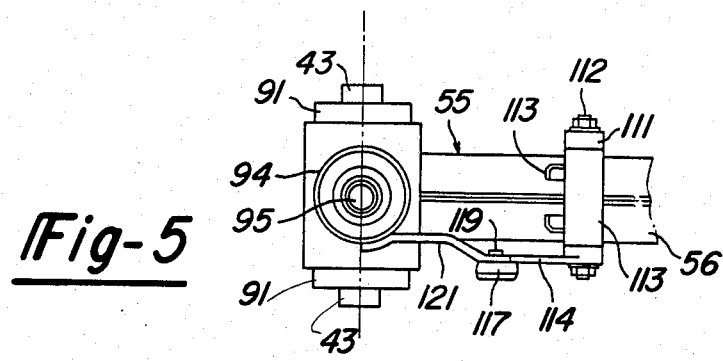
FIG. 5 is a reduced scale, side elevational view taken in the direction of the arrow 5 in FIG. 3 with the rear wheel removed.
Figure 6:
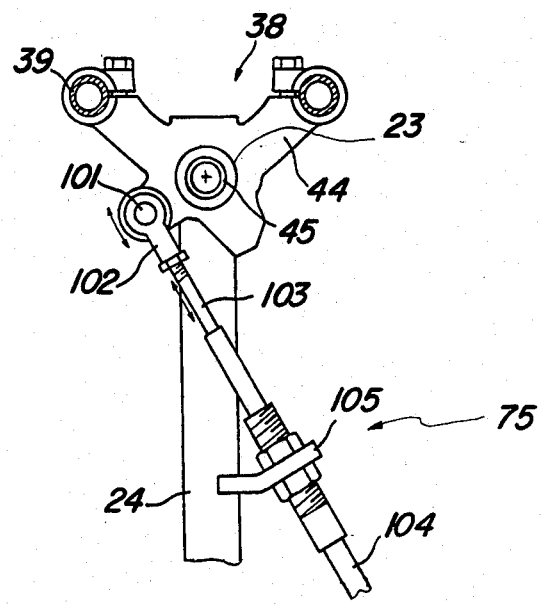
FIG. 6 is a cross-sectional view taken along the line 6—6 of FIG. 2.

The rear wheel 49 is supported for suspension movement relative to the frame 22 by means that include a trailing arm assembly, indicated generally by the reference numeral 55 and shown in most detail in FIG. 3. Because of differences which will be described, the trailing arm assembly 53 includes one rearwardly extending arm portion 56 that lies on only one side of the rear wheel assembly 49 and which supports the rear wheel assembly by means of a hub carrier 57 that is fixed at its trailing end in a manner to be described. Forwardly of the rearwardly extending portion 56, the trailing arm 55 has a main portion 58 that extends substantially across the width of the motorcycle between the brackets 25 and which is formed by a welded up box section 59. This box section 59 has a tube 61 carried at its forward end, which tube is, in turn, journaled on a pair of axial spaced bushings 62 and 63 that are, in turn, journaled on a shaft 64 that is carried in the brackets 25. The shaft 64 is held in place by means of an elongated bolt 65 that extends through the interior of the shaft 64 and which is held in place by a nut 66 and retainer 67.

The suspension travel of the rear wheel 49 and trailing arm 55 are controlled by a combined coil spring and shock absorber unit 68 that is loaded between the rear end of the arm portion 56 and the frame 22 at a point contiguous to where the seat pillar 28 joins the seat rail.

The rear wheel 49 is driven and to this end a driving sprocket 69 is affixed to the engine transmission output shaft 34. A driving chain 71 encircles the sprocket 69 and a driven sprocket 72 that is affixed for rotation with the rear wheel 49 in a manner which will be described. A chain tensioner 73 is carried by the trailing arm 55 so as to maintain uniform tension on the driving chain 71 during its suspension movement.

In addition to being driven and supported for suspension movement, the rear wheel assembly 49 is also supported for steering movement by means of a steering support, indicated generally by the reference numeral 74. The steering support 74 is designed so as to provide a steering axis $A_2$ that passes through the transverse center of the rear wheel assembly 49 and which lies on a plane P passing through the center of the motorcycle 21 and containing the front wheel steering axis $A_1$. The rear wheel steering axis $A_2$ extends vertically so that the contact point between the rear wheel 49 and the ground line GL lies at the point $Q_2$.

The steering of the rear wheel 49 about the steering axis $A_2$ is controlled by means of a steering control mechanism, indicated generally by the reference numeral 75 which connects the front wheel steering mechanism with the rear wheel steering support mechanism 74 in a manner to be described.

Referring now primarily to FIGS. 1, 3, 4 and 5, the rear wheel steering support mechanism 74 will be described in detail. The hub carrier 57 has a pair of spaced apart bearings that rotatably journal a shaft 76. The shaft 76 has a splined connection to a hub member 77 which is, in turn, affixed to the sprocket 72 by means of bolt assemblies. The sprocket 72 and hub member 77 are axially affixed to the shaft 76 by means of a nut 78.

The hub member 77 forms a portion of a drum brake assembly, indicated by the reference numeral 79. This drum brake assembly includes a brake drum 81 which is integrally formed with the hub member 77 and in which a pair of brake shoes 82 are supported. The brake shoes 82 are normally urged into engagement with a return steady rest pin 83 carried by the hub carrier 57 and are actuated by means of an actuating cam 84 that is fixed to one end of a brake actuating shaft 85. Upon rotation of the brake actuating shaft 85 which is journaled in the hub carrier 57, the cam 84 will rotate and urge the brake shoes 82 outwardly into frictional engagement with the brake dum 81, in a known manner.

A brake actuating lever 86 is carried by the exposed end of the brake actuating shaft 85 and is connected to a flexible actuator 87 by means including a yoke 88 and nut assembly 89. When the flexible actuator 87 is operated so as to rotate the lever 86, the drum brake 79 will be actuated in the previously described manner.

The hub carrier 57 has affixed to it a bifurcated member 91 which, in turn, is pivotally connected to a second bifurcated member 92 by means of a pair of vertically disposed pivot pins 93. The pivot axis between the bifurcated members 91 and 92 defined by the pivot pins 93 lies on the steering axis $A_2$ of the rear wheel assembly 49 and also within the plane P.

The further bifurcated member 92 is affixed to a second hub carrier 94 which, in turn, journals a shaft 95 by means of a pair of spaced bearings. The shaft 95 is non-rotatably affixed to the rear wheel hub 54 by a splined connection and the hub 54 is held axially onto the shaft 95 by means of a retainer nut 96.

The shafts 76 and 95 are rotatably coupled by means of a universal joint 97 that has its respectively members affixed to the shafts 76 and 95 by means of retainer nuts 98 and 99, respectively. The universal joint 97 has its pivotal axis O lying within the plane P on the steering axis $A_2$ so that the steering movement of the rear wheel assembly 49 will not interfere with the driving forces transmitted to the rear wheel through the universal joint 97. The point O and the steering axis $A_2$ pass through the center of the rear wheel assembly 49 and specifically its rim 52 and the tire 51.

The steering control mechanism 75 is provided for mechanically coupling the front wheel steering mechanism to the mechanism for steering the rear wheel 74 so that both wheels will be steered in unison. This mechanism includes a pin 101 (FIG. 6) that is affixed to the lowermost fork bracket 44 at a point offset from the front steering axis $A_1$. A trunion member 102 connects the pin 101 to one end of a flexible transmitter 103 that is contained within a protective sheath 104. The adjacent forward end of the protective sheath 104 is carried by the down tube 24 and specifically by means of a bracket 105 that is connected to it.

The rear end of the protective sheath 104 is fixed adjustably to a bracket 106 carried by the trailing arm assembly 55. The rear end of the wire actuator 103 is connected by means of a trunion 107 and pivot pin 108 to one arm 109 of a bellcrank assembly 111. The bellcrank assembly 111 is supported for pivotal movement about a vertically extending axis by means of a pivot pin 112 that is carried by a bracket 113 that is affixed to the trailing arm portion 56. Another arm 114 of the bellcrank 111 is connected by means of a pivot pin 115 to a trunion 116. The trunion 116 is connected to a further trunion 117 by means of a turn buckle assembly 118 so as to permit adjustment between the trunions 116 and 117. The trunion 117 is, in turn, connected by means of a pivot pin 119 to a steering arm 121 that is formed integrally with or affixed to the hub carrier 94.

The steering operation of this embodiment will now be described. If the rider steers the front wheel 37 to the right by rotating the handlebars 46 and front wheel 37 in a clockwise direction about the steering axis $A_1$ as viewed in FIG. 1 (counterclockwise as viewed in FIG. 6), there will be a force exerted on the flexible transmitter 103 to urge it in a rearward direction. This rearward movement places a force on the bellcrank 111 and specifically its arm 109 so as to urge it rearwardly in a counterclockwise direction about the pivot pin 112. The arm 115 then exerts a force through the turn buckle 118 to the right as viewed in FIG. 3 so as to pivot the steering arm 112 and hub carrier 94 in a clockwise direction about the rear steering axis $A_2$. Thus, both the front and rear wheels will be steered in the same direction. The mechanical arrangement of the linkage system is such, however, that the angle of steering movement of the rear wheel 49 will be less than the angle of steering movement of the front wheel 37, for example, aboutr 20% of the front wheel steering. It is believed that steering operation to the left is readily apparent from the aforenoted description and construction.

Because of the use of the flexible transmitter for transmitting the steering motion from the front to rear wheel, the suspension movement of the rear wheel 49 is easily accommodated and there will be no feedback or steering of the rear wheel 49 merely due to the suspension movement per se.

In the embodiment of FIGS. 1 through 6, the rear wheel 49 was steered in the same direction as the front wheel 37. This has the effect of slightly increasing the steering radius or, in effect, creating a condition known as understeer. This type of arrangement has been found to be best for handling under high speed operation. In some instances, however, it is desirable to have the front and rear wheels steer in opposite directions so as to create an oversteering condition. This arrangement is particularly useful in connection with steering of the motorcycle when it is being pushed by hand or driven at low speeds. The embodiment of FIGS. 7 through 13 illustrates how such an arrangement may be achieved.

A motorcycle 201 constructed in accordance with this embodiment is illustrated in the drawings. The motorcycle 201 has a general overall construction of the type as described in the preceding embodiment. That is, the frame mechanism, front wheel steering mechanism, rear wheel supporting mechanism and the rear wheel steering mechanism is the same as the previously described embodiment. Only the mechanism for transmitting steering movement from the front to the rear wheel differs and for that reason components which are the same or substantially the same in construction and operation as the previously described embodiment have been identified by the same reference numerals and will not be described again in detail.

Figure 7:
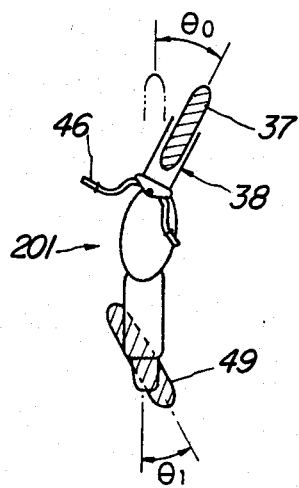
FIG. 7 is a top plan, partially schematic view, showing another embodiment of the invention steered in one direction.
Figure 8:
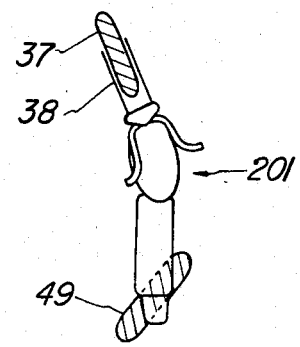
FIG. 8 is a top plan, partially schematic view, in part similar to FIG. 7, showing the steering of this embodiment in the opposite direction.
Figure 9:
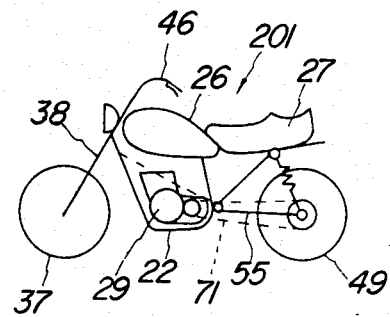
FIG. 9 is a partially schematic, side elevational view of this embodiment.
Figure 10:
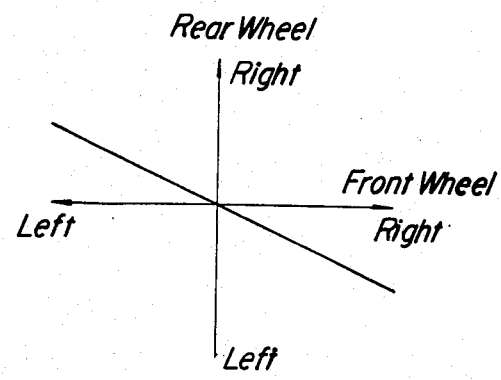
FIG. 10 is a graphical view showing the relationship of the front and rear wheel steering of this embodiment.
Figure 11:
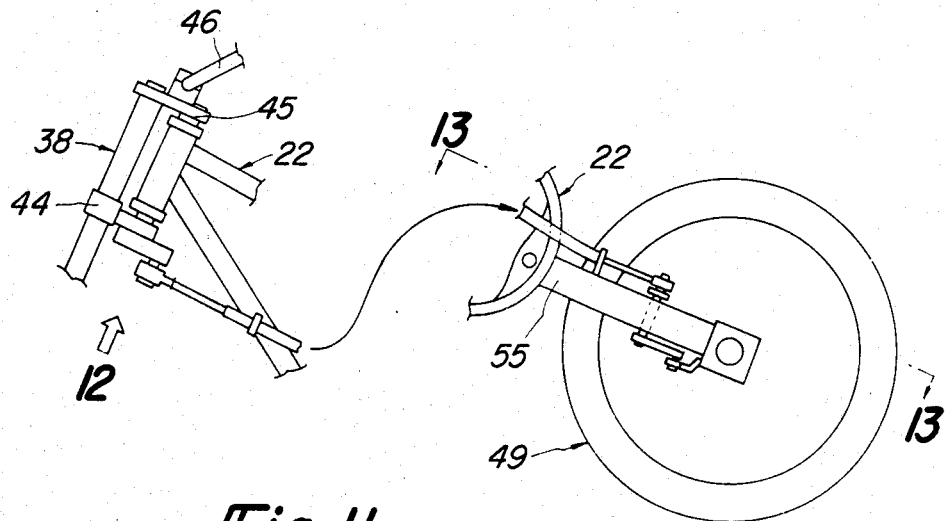
FIG. 11 is a fragmentary, side elevational view showing the interrelationship between the front and rear wheel steering.

The steering relationship in this embodiment between the front wheels 37 and the rear wheels 49 is illustrated graphically in FIG. 10 and schematically in FIGS. 7 and 8. In FIG. 10, the rear wheel steering is indicated on the Y-Y axis and the front wheel steering is indicated on the X-X axis. It will be seen that as the front wheel is steered to the right, the rear wheel is steered to the left and vice versa. This is accomplished in the manner now to be described.

Figure 12:
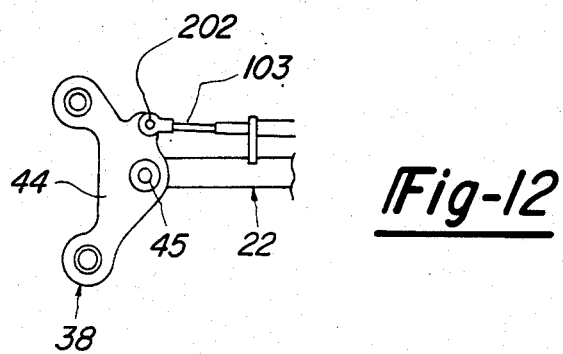
FIG. 12 is a view taken in the direction of the arrow 12 in FIG. 11.
Figure 13:
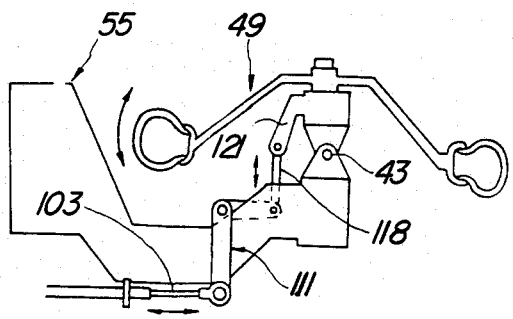
FIG. 13 is a view taken generally in the direction of the line 13—13 in FIG. 11 and shows the association of the steering mechanism with the rear wheel.

Looking at FIG. 12, it will be noted that the front end of the flexible transmitter 103 is connected to the plate 44 by means of a pivot pin 202 that is disposed on the opposite side of the axis 45 ($A_1$) from the previously described embodiment. Hence, when the handlebars 46 are turned to the right as seen in FIG. 7 in a clockwise direction about the axis $A_1$, the pivot pin 202 will be rotated in a counterclockwise direction about the axis $A_1$ and a tensile force will be exerted on the flexible transmitter 103. This force will cause the bellcrank 111 to be rotated in a clockwise direction so as to exert a force on the trunion 118 that is transmitted through the steering arm 121 to pivot the rear wheel 49 to the left as seen in FIG. 7. The mechanism advantages such that the front wheel rotates through the axis $\theta_O$ while the rear wheel rotates through the axis $\theta_1$. These angles may be the same or different, as desired.

It should be readily apparent that steering to the left occurs in an opposite manner and this is believed to be clear from the foregoing description.

In view of the foregoing, it is believed to be readily apparent to those skilled in the art that a relatively simple and yet highly effective mechanism has been disclosed for permitting steering of the rear wheel mechanically in response to steering of the front wheel. This can be done to improve handling and, in the two embodiments, one arrangement is provided wherein the steering of the wheels is in the same direction and the other where they are in the opposite direction. Although embodiments of the invention have been illustrated and described, various changes and modifications may be made without departing from the spirit and scope of the invention, as defined by the appended claims.

We claim:

1. A vehicle having at least one dirigible front wheel steered by an operator and at least one rear wheel, the improvement comprising means for supporting said rear wheel for steering movement, means for supporting said front and said rear wheels for suspension movement, and means comprising a linkage system for mechanically coupling rear wheel steering mechanism to said front wheel steering mechanism for simultaneous steering movement.

2. A vehicle as set forth in claim 1 wherein at least one of the steered wheels is driven.

3. A vehicle as set forth in claim 2 wherein the rear wheel is the driven wheel.

4. A vehicle as set forth in claim 1 wherein the front and rear wheels are steered in the same direction.

5. A vehicle as set forth in claim 1 wherein the vehicle comprises a motorcycle having only a single steered front wheel and a single steered rear wheel.

6. A vehicle as set forth in claim 1 wherein the front and rear wheels are steered in the opposite direction.

7. A vehicle as set forth in claim 1 wherein the rear wheel is supported by means of a trailing arm having a first hub carrier affixed to the trailing arm and rotatably journaling a first shaft, a second hub carrier pivotally connected to said first hub carrier about the steering axis of the rear wheel, a second shaft journaled by said second hub carrier and rotatably coupled to the rear wheel and universal joint means interconnecting said first and second shafts for rotation, the universal joint means having its pivot axis lying in said rear wheel steering axis.

8. A vehicle as set forth in claim 1 wherein the linkage system comprises a first lever affixed to a fork of the front wheel, a flexible transmitter having a first end thereof connected to said first lever at a point offset from the steering axis of the front wheel, a bellcrank supported for pivotal movement relative to the rear wheel, the other end of said flexible transmitter being connected to one arm of said bellcrank for pivoting said bellcrank upon steering movement of said front fork, a steering arm affixed to the rear wheel and supporting the rear wheel for rotation about a rotational axis and for steering movement about a steering axis, and means for pivotally connecting the other arm of the bellcrank to said rear wheel steering arm.

9. A vehicle as set forth in claim 8 further including a universal joint for driving the rear wheel and having its axis aligned with the steering axis.

10. A vehicle as set forth in claim 8 wherein the front and rear wheels are steered in the same direction.

11. A vehicle as set forth in claim 8 wherein the front and rear wheels are steered in the opposite direction.

12. A vehicle as set forth in claim 8 wherein at least one of the steered wheels is driven.

13. A motorcycle having at least one dirigible front wheel steered by an operator and one driven one rear wheel, the improvement comprising means for supporting said rear wheel for steering movement and a linkage system for mechanically coupling said front and said rear wheels for simultaneous steering movement, said linkage system comprising a first lever affixed to a fork of said front wheel, a flexible transmitter having a first end thereof connected to said first lever at a point offset from the steering axis of said front wheel, a bellcrank supported for pivotal movement relative to said wheel, the other end of said flexible transmitter being connected to one arm of said bellcrank for pivoting said bellcrank upon steering movement of said front fork, a steering arm affixed to the rear wheel and supporting the rear wheel for rotation about a rotational axis and for steering movement about a steering axis, and means for pivotally connecting the other arm of the bellcrank to said rear wheel steering arm.

14. A vehicle as set forth in claim 13 further including a universal joint for driving the rear wheel and having its axis aligned with the steering axis.

15. A motorcycle having one dirigible front wheel steered by an operator and one driven rear wheel, the improvement comprising means for supporting said rear wheel for steering movement and a linkage system for mechanically coupling said front and said rear wheels for simultaneous steering movement, said rear wheel being supported by means of a trailing arm having a first hub carrier affixed to said trailing arm and rotatably journaling a first driven shaft, a second hub carrier pivotally connected to said first hub carrier about the steering axis of said rear wheel, a second shaft journaled by said second hub carrier and rotatably coupled to the rear wheel and universal joint means interconnecting said first and second shafts for rotation, the universal joint means having its pivot axis lying on said rear wheel steering axis.

* * * * *